(12) United States Patent
Fischer

(10) Patent No.: US 6,807,640 B2
(45) Date of Patent: Oct. 19, 2004

(54) PROGRAMMABLE INTERFACE CONTROLLER SUITABLE FOR SPANNING CLOCK DOMAINS

(75) Inventor: Michael Andrew Fischer, San Antonio, TX (US)

(73) Assignee: Intersil Americas, Inc., Milpitas, CA (US)

( * ) Notice: Subject to any disclaimer, the term of this patent is extended or adjusted under 35 U.S.C. 154(b) by 662 days.

(21) Appl. No.: 09/850,803

(22) Filed: May 8, 2001

(65) Prior Publication Data

US 2002/0194519 A1 Dec. 19, 2002

(51) Int. Cl.[7] ................................................. G06F 5/06
(52) U.S. Cl. ........................ 713/600; 713/400; 713/401; 713/600; 713/1; 713/2; 713/100; 709/200; 709/202; 709/228; 709/233; 709/245; 712/11; 712/16; 712/220; 455/73; 455/130; 455/448
(58) Field of Search ................................ 713/400, 401, 713/600, 1, 2, 100; 709/200, 202, 228, 233, 245; 712/11, 16, 220; 455/73, 130, 448

(56) References Cited

U.S. PATENT DOCUMENTS

| | | | | |
|---|---|---|---|---|
| 4,549,228 A | * | 10/1985 | Dieterich | 386/113 |
| 5,166,674 A | * | 11/1992 | Baum et al. | 714/752 |
| 5,247,657 A | * | 9/1993 | Myers | 709/236 |
| 5,289,580 A | * | 2/1994 | Latif et al. | 710/63 |
| 5,564,117 A | * | 10/1996 | Lentz et al. | 345/502 |
| 5,588,117 A | * | 12/1996 | Karp et al. | 709/232 |
| 5,745,886 A | * | 4/1998 | Rosen | 705/39 |
| 5,758,291 A | * | 5/1998 | Grube et al. | 455/518 |
| 6,310,884 B1 | * | 10/2001 | Odenwald, Jr. | 370/412 |
| 6,314,500 B1 | * | 11/2001 | Rose | 711/148 |
| 6,317,804 B1 | * | 11/2001 | Levy et al. | 710/305 |
| 6,493,342 B1 | * | 12/2002 | Breslow et al. | 370/394 |
| 6,519,234 B1 | * | 2/2003 | Werkander | 370/328 |
| 6,581,164 B1 | * | 6/2003 | Felts et al. | 713/400 |
| 6,665,810 B1 | * | 12/2003 | Sakai | 713/600 |
| 6,747,997 B1 | * | 6/2004 | Susnow et al. | 370/509 |
| 2002/0078252 A1 | * | 6/2002 | Fields et al. | 709/314 |

OTHER PUBLICATIONS

NEC Electronics, Inc. "1987 Microcomputer Data Book, Microprocessors, Peripherals, and DSP Products," vol. 2 of 2, Aug., 1986. (In particular, the FIFO buffer on p. 6–167 and the HGDC on p. 6–169.
Intel "MCS–96 User's Manual," 1984. (In particular, the HSIO Unit on p. 2–1 and associated text on pp. 2–13 through 2–14.
Intel "Back to Basics: High Speed Output for the 8XC196KC/KD," from Intel Developer's CD ROM, 1997.

* cited by examiner

Primary Examiner—A. Elamin
Assistant Examiner—Nitin C. Patel
(74) Attorney, Agent, or Firm—DeMont & Breyer, LLC

(57) ABSTRACT

A programmable interface controller for transmitting data to an output device that is suitable in both fully synchronous systems and in systems that span clock domains. The illustrative embodiments comprise: receiving a plurality of field identifiers and an indication of an order by which each of the plurality of field identifiers is to be uniquely associated with each field in a sequence of fields; receiving a stream of data that comprises the sequence of fields and an indication of the boundary between successive fields in the sequence of fields; and processing each field in the stream of data in accordance with the field identifier uniquely associated with that field.

29 Claims, 3 Drawing Sheets

PROGRAMMABLE INTERFACE CONTROLLER SUITABLE FOR SPANNING CLOCK DOMAINS

FIELD OF THE INVENTION

The present invention relates to digital system design in general, and, more particularly, to a programmable interface controller that is suitable for spanning clock domains.

BACKGROUND OF THE INVENTION

FIG. 1 depicts a block diagram of a digital system in the prior art that spans multiple clock domains. The system comprises data source 101, communications path 102, interface controller 103, communications path 104, output device 105, clock generator 107, and clock generator 108. In accordance with digital system 100, data source 101 operates in accordance with a first clock from clock generator 107 and output device 105 operates in accordance with a second clock from clock generator 108.

When clock generator 107 produces a clock with a different clock rate (i.e., frequency) or a different phase than the clock from clock generator 108, interface controller 103 comprises circuitry for ensuring the reliable transmission of data from data source 101 to output device 105 and across the clock domain boundary. Typically, interface controller 103 typically ran at a clock rate that was some multiple of the first clock rate or the second clock rate to enable it to synchronize with both the data source 101 and output device 105. In low power (e.g., battery powered, etc.) applications, this is disadvantageous because the high clock rate of interface controller 103 causes a great deal of power consumption.

Therefore, the need exists for an interface controller that is suitable for spanning clock domains and that can have a lower power consumption than interface controllers in the prior art.

SUMMARY OF THE INVENTION

The present invention provides a technique for transmitting data to an output device without some of the costs and disadvantages associated with techniques for doing so in the prior art. In particular, the first illustrative embodiment provides an interface controller that is suitable for spanning clock domains, and the second illustrative embodiment provides an interface controller that is useful in fully synchronous systems (i.e., systems in which the data source and the output device operate in accordance with a single clock). The interface controller in both the first and second illustrative embodiments can be powered-down when not needed, which is particularly useful in low-power applications. Furthermore, the interface controller in both the first and second illustrative embodiments is programmable by the data source, which is particularly useful in off-loading from the data source to the interface controller some of the computational tasks associated with outputting data.

Both illustrative embodiments provide a data source, which generates data, and an interface controller, which transmits the data to the output device and which assists the data source in preparing the data for output. In a fully synchronous system, both the data source and the interface controller operate in accordance with a single clock. In a system that spans clock domains, the data source operates in accordance with a first clock, and the interface controller operates in accordance with a second clock, which is synchronized with the output device's clock.

In both cases, the interface controller comprises a programmable processor that is programmed by the data source on how to process the data to be output. In accordance with the illustrative embodiments, the data source transmits one or more field identifiers and an indication of an order by which each of the field identifiers is to be uniquely associated with each field in a sequence of fields. This is because the data source will afterwards transmit the data in each of the fields, one after another, to the interface controller without any explicit identification of the fields, and, therefore, the interface controller must have some deterministic mechanism for uniquely associating each received field with a field identifier.

The illustrative embodiments comprise: receiving a plurality of field identifiers and an indication of an order by which each of the plurality of field identifiers is to be uniquely associated with each field in a sequence of fields; receiving a stream of data that comprises the sequence of fields and an indication of the boundary between successive fields in the sequence of fields; and processing each field in the stream of data in accordance with the field identifier uniquely associated with that field.

DETAILED DESCRIPTION

Figure 1:
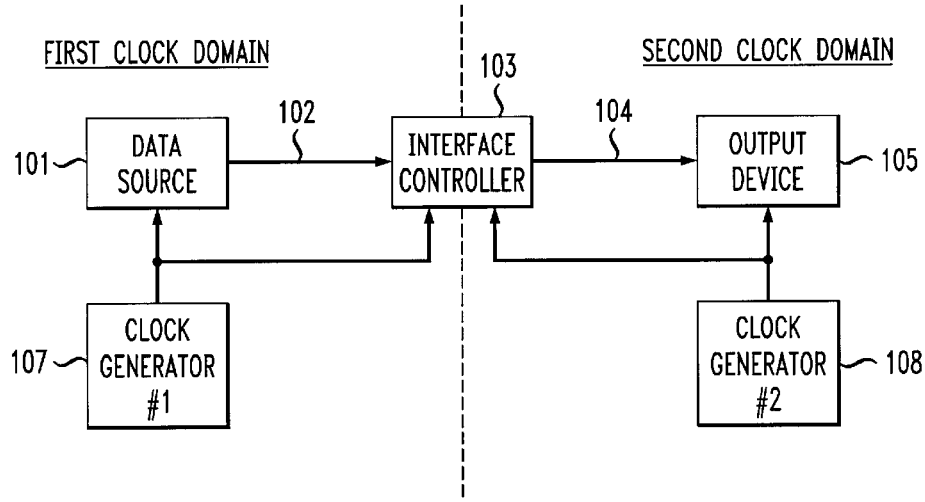
FIG. 1 depicts a block diagram of a digital system in the prior art that spans multiple clock domains.
Figure 2:
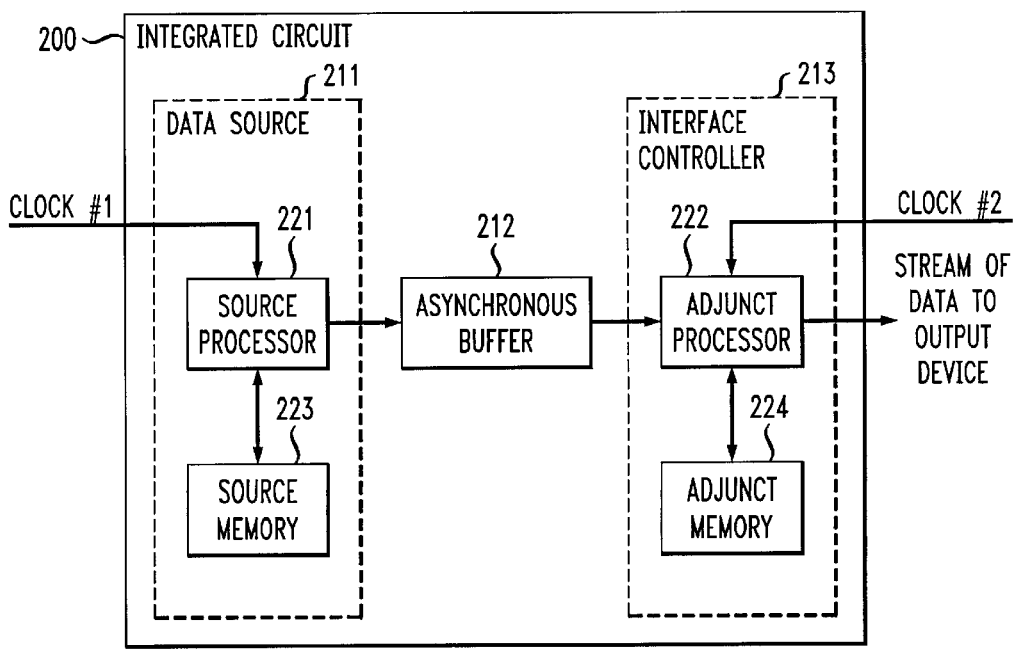
FIG. 2 depicts a block diagram of the illustrative embodiment of the present invention.

FIG. 2 depicts a block diagram of the first illustrative embodiment of the present invention, which is contained entirely on a single integrated circuit. For the purpose of this specification, the term "integrated circuit" is defined as a slice or chip of material on which is etched or imprinted a complex of electronic components and their interconnections.

Integrated circuit 200 comprises data source 211, asynchronous buffer 212, and interface controller 213. In accordance with the first illustrative embodiment, data source 211 operates in accordance with a first clock and interface controller 212 operates in accordance with a second clock, which second clock is the clock for an output device (e.g., a printer, a hard drive, a network controller, a wireless transceiver, etc.). In accordance with the first illustrative embodiment, the first clock is different than the second clock (i.e., has a different frequency or different phase or both a different frequency and different phase). It will be clear to those skilled in the art that integrated circuit 200 can comprise other components that are not shown in FIG. 2.

It will be clear to those skilled in the art that some other embodiments of the present invention are contained on two or more integrated circuits. For example, data source 211 can be on one integrated circuit and interface controller 213 could be on another integrated circuit. As another example, data source 211 can be on two or more integrated circuits and interface controller 213 can be on the same integrated circuit as the output device. In any case, it will be clear to those skilled in the art how to distribute the components of the present invention across one or more integrated circuits.

Data source 211 comprises source processor 221 and source memory 223.

Source processor 211 is a general-purpose processor that has read and write access to source memory 223. The functions performed by source processor 211 are described in detail below and with respect to FIG. 4. In some alternative embodiments of the present invention, source processor 211 is a special-purpose processor (e.g., a digital signal processor, embedded microcontroller, etc.). In any case, it will be clear to those skilled in the art how to make and use source processor 211.

Because data source 211 and interface controller 213 operate in accordance with different clocks, asynchronous buffer 212 mediates, in well-known fashion, the transmission of data from data source 211 to interface controller 212. Asynchronous buffer 212 comprises one or more memory storage locations and the associated asynchronous controller for enabling asynchronous buffer 212 to carry data from source processor 221 to adjunct processor 222. For example, asynchronous buffer 212 can comprise a plurality of memory storage locations that operate in bucket-brigade fashion to manifest a first-in, first-out queue, or can comprise a dual-port random access memory with associated read-pointer, write-pointer, and contention logic. In any case, it will be clear to those skilled in the art how to make and use asynchronous buffer 212.

Interface controller 213 comprises adjunct processor 222 and adjunct memory 224.

Adjunct processor 222 is a special-purpose processor that is:

1. capable of storing data into, and of retrieving data from, adjunct memory 224; and
2. is responsive to field identifiers, which are described below, that are stored in adjunct memory 224.

The functions performed by adjunct processor 222 are described in detail below and with respect to FIG. 4. In some alternative embodiments of the present invention, adjunct processor 222 is a general-purpose processor. In any case, it will be clear to those skilled in the art how to make and use adjunct processor 222 and adjunct memory 224.

Figure 3:
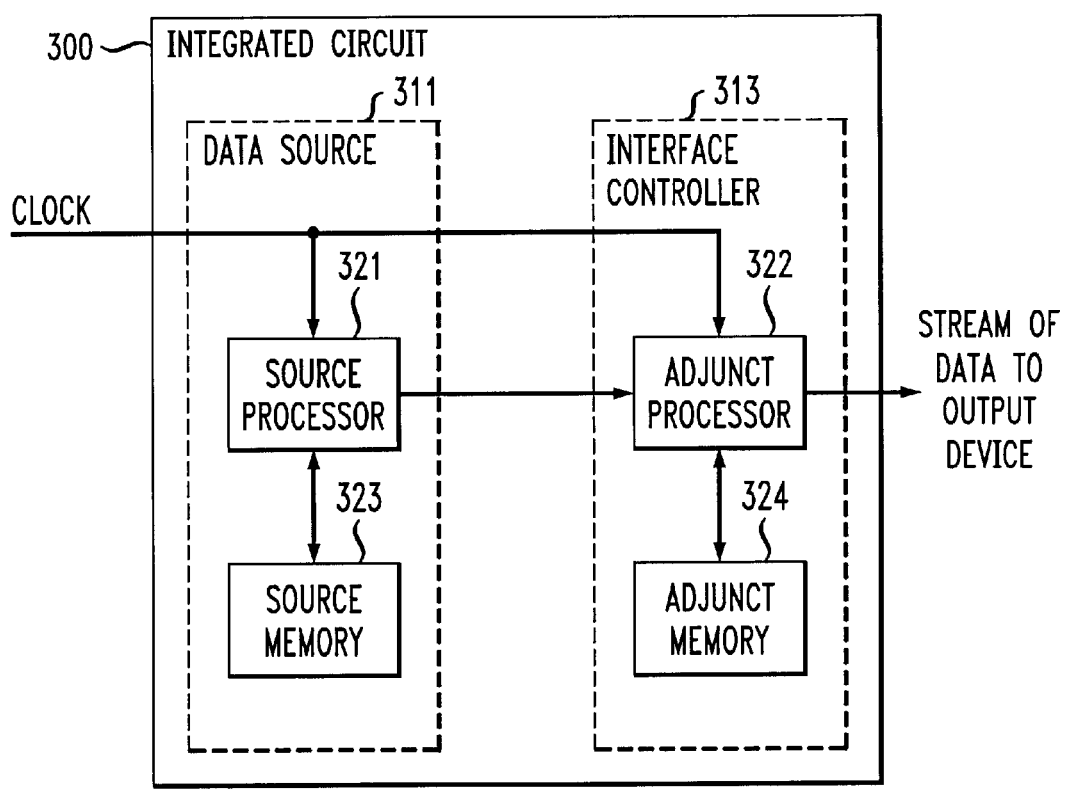
FIG. 3 depicts a block diagram of the second illustrative embodiment of the present invention, which is contained entirely on a single integrated circuit.

FIG. 3 depicts a block diagram of the second illustrative embodiment of the present invention, which is contained entirely on a single integrated circuit.

Integrated circuit 300 comprises data source 311 and interface controller 313. The difference between the first illustrative embodiment and the second illustrative embodiment is that the second illustrative embodiment is a fully synchronous design (i.e., the second illustrative embodiment does not span clock domains). In other words, in the second illustrative embodiment, data source 311 and interface controller 313 both operate in accordance with one clock. Because data source 311 and interface controller 313 both operate in accordance with one clock, no asynchronous buffer is needed between them, and data is transmitted from source processor 321 to adjunct processor 322 synchronously.

It will be clear to those skilled in the art that some other embodiments of the present invention are contained on two or more integrated circuits. For example, data source 311 can be on one integrated circuit and interface controller 313 could be on another integrated circuit. As another example, data source 311 can be on two or more integrated circuits and interface controller 313 can be on the same integrated circuit as the output device. In any case, it will be clear to those skilled in the art how to distribute the components of the present invention across one or more integrated circuits.

In all other respects, source processor 321 is the same as source processor 221, source memory 323 is the same as source memory 223, adjunct processor 322 is the same as adjunct processor 222, and adjunct memory 324 is the same as adjunct memory 234. Furthermore, the functions performed by data source 311 are the same those performed by data source 211 and the functions performed by interface controller 313 are the same as those performed by interface controller 213. Therefore, the description below and with regard to FIG. 4 of the operation of integrated circuit 200 and its operation is equally applicable to integrated circuit 300 and its operation.

In both the first illustrative embodiment and the second illustrative embodiment, the data source can be powered and operated independently of the interface controller. In other words, either the data source or the interface controller can be powered-down without powering-down or affecting the operation of the other. It will be clear to those skilled in the art how to make and use embodiments of the present invention in which the data source is powered and operated independently of the interface controller.

Figure 4:
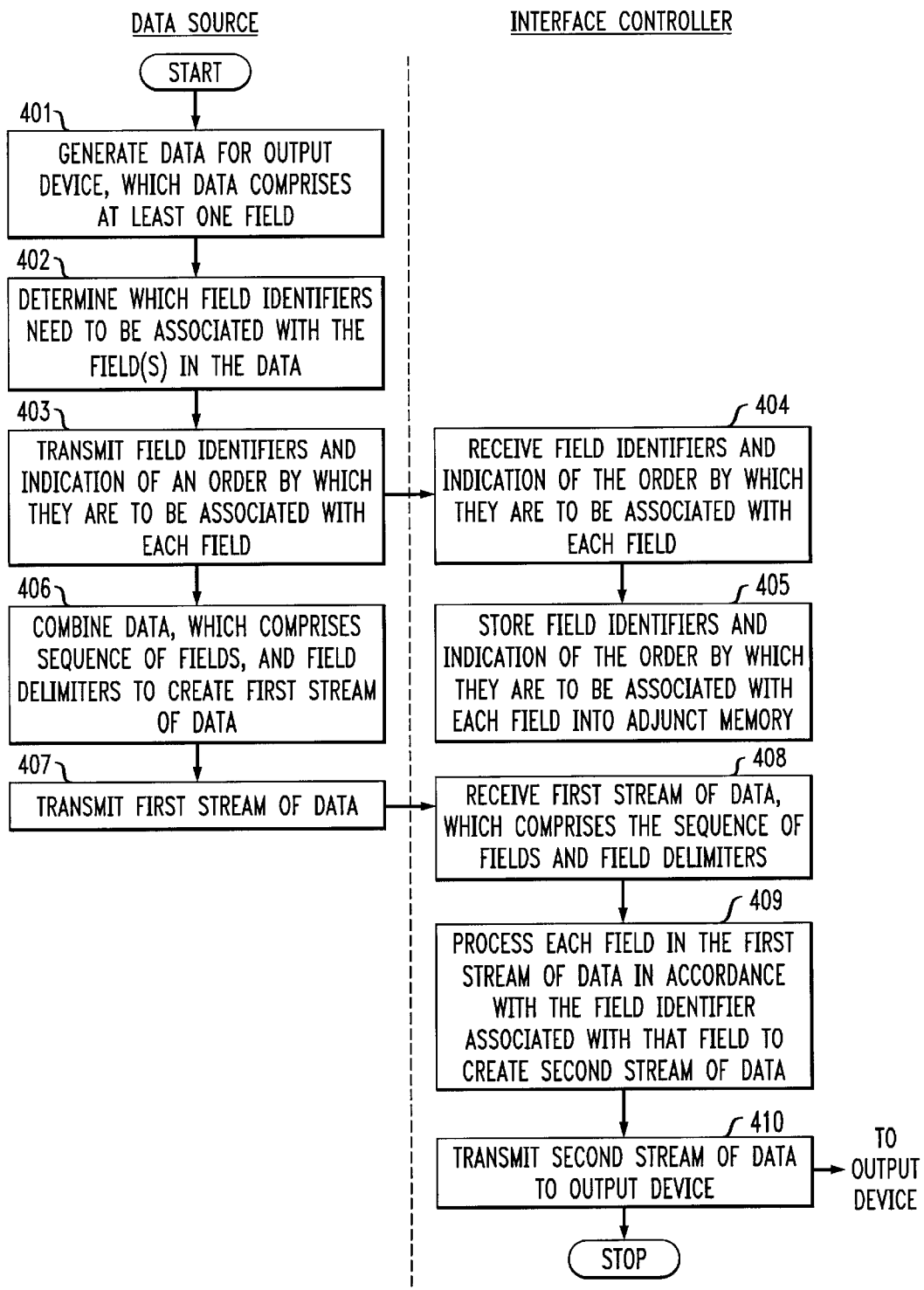
FIG. 4 depicts a flowchart of the operation of both the first and second illustrative embodiments.

FIG. 4 depicts a flowchart of the operation of both the first and second illustrative embodiments. Although the precise clocking of the first illustrative embodiment is different than the clocking of the second illustrative embodiment, the operations described below and with respect to FIG. 4 are equally descriptive of the operation of both embodiments.

At task 401, the source processor generates payload data destined for an output device. In accordance with the illustrative embodiments, the payload data comprises one or more fields. For the purposes of this specification, a "field" is defined as a group of the same type of data.

To facilitate an understanding of the present invention, the illustrative embodiments are described as they operates on illustrative payload data. For example, illustrative payload data might comprise the number of attendees at a meeting, the names of the attendees at the meeting, and their hometowns. Table 1 depicts the illustrative payload data and the partitioning of the payload data into five fields.

TABLE 1

Illustrative Payload data

| Payload data | Field Name |
| --- | --- |
| 2 | Meeting Size |
| Bob Smith | Name |
| Oskosh, WI | Address |
| Bill Jones | Name |
| Muncie, IN | Address |

It will be clear to those skilled in the art that the payload data in Table 1 could have been partitioned into a different number of fields. For example, each attendee's name could have been partitioned into "First Name" and "Last Name" fields or "First Name," "Middle Name," and "Last Name" fields. In any case, it will be clear to those skilled in the art how to generate payload data and how to partition it into fields.

Furthermore, it will be clear to those skilled in the art that the payload data (and the source data to be described below) can comprise two or more fields of the same type. For example, the payload data in Table 1 comprises two Name fields and two Address fields.

Because the illustrative payload data is transmitted via a network to a remote terminal, which has the illustrative network address "123.24.12.53," the illustrative payload data is encapsulated in a packet for transmission over the network. The illustrative packet comprises three fields: (1) a header field, (2) a payload field, and (3) a checksum field, in that order. The Header Field contains the network address of the remote terminal to which the packet is transmitted. The Payload Field contains the payload data, and the Checksum Field contains an error-detection code that assists the remote terminal in determining whether the packet has been corrupted in transfer.

Therefore, the payload data in Table 1 is augmented with the header and checksum fields, as shown in Table 2.

TABLE 2

Illustrative Augmented Payload Data

| Field No. | Source Data | Field Name | Final Size (in octets) | Comment |
|---|---|---|---|---|
| 1 | 123.24.12.53 | Header | 4 | network address (in dotted-decimal) |
| 2 | 2 | Meeting Size | 1 | in binary-coded decimal |
| 3 | Bob Smith | Name | 9 | to be encrypted |
| 4 | Oskosh, WI | Address | 11 | to be transmitted as is |
| 5 | Bill Jones | Name | 10 | to be encrypted |
| 6 | Muncie, IN | Address | 10 | to be transmitted as is |
| 7 | XX XX XX XX | Checksum | 4 | to be computed by adjunct processor |

In accordance with the illustrative augmented payload data, the Header Field as transmitted by the data source to the interface controller will contain the network address in dotted-decimal notation. Upon receiving the network address, the interface controller will be responsible for converting the network address from dotted-decimal notation into straight binary notation.

The Meeting Size Field as transmitted by the data source to the interface controller will contain an integer in binary-coded decimal. Upon receiving the integer in the Meeting Size Field, the interface controller will be responsible for converting the integer in the meeting field from binary-coded decimal into straight binary.

Each of the two Name Fields as transmitted by the data source to the interface controller will contain a name in ASCII. For privacy reasons, the interface controller will be responsible encrypting each name in accordance with an algorithm and key known to both the data source and the remote terminal.

Each of the two Address Fields as transmitted by the data source to the interface controller will contain an address in ASCII. The interface controller is to not to transform the data in either of these fields. In other words, the interface controller is to perform no operation on the data in those fields.

The Checksum Field as transmitted by the data source to the interface controller will contain four placeholder octets that have no meaning. The interface controller will be responsible for computing the checksum for the packet, in accordance with a generator polynomial known to both the data source and the remote terminal, and for overwriting the placeholder octets with the actual computed checksum.

In some alternative embodiments of the present invention, no placeholder octets are transmitted in a field from the source processor to the adjunct processor and the adjunct processor inserts the data associated with the field into the stream of data for the output device. In yet some other alternative embodiments of the present invention, fewer placeholder octets are transmitted in a field from the source processor to the adjunct processor than are needed in which case the adjunct processor overwrites the existing placeholder octets with some of the data and inserts the remainder of the data into the stream of data for the output device. And in still some other alternative embodiments of the present invention, more placeholder octets are transmitted in a field from the source processor to the adjunct processor than are needed in which case the adjunct processor overwrites the existing placeholder octets and deletes the superfluous placeholder octets from the stream of data for the output device.

At task 402, the source processor determines which field identifiers should be associated with which fields in the augmented payload data. For the purpose of this specification, the term "field identifier" is defined as an operation code for the data in the field associated with the field identifier.

In accordance with the illustrative embodiments of the present invention, the data source and interface controller have a set of available field identifiers that enable the data source to direct the interface controller to perform (or not perform) a given operation on the data in a field. Table 2 depicts a listing of the eight field identifiers available to the data source and interface controller in the illustrative embodiments.

TABLE 3

Illustrative Set of Available Field Identifiers

| Field Identifier | Associated Operation | Associated Operand |
|---|---|---|
| 1 | no operation or "no-op" (i.e., transmit as it | none |
| 2 | encrypt data - encryption state follows | 8 octet encryptor state |
| 3 | encrypt data - use existing state | none |
| 4 | convert data from binary-coded decimal to straight binary | none |
| 5 | convert data from dotted-decimal to straight binary | none |
| 6 | insert checksum | 20 byte generator polynomial coefficients |
| 7 | compress data with Huffman coding - generate coding table | none |
| 8 | compress data with Huffman coding - use coding table in adjunct memory | none |

For example, field identifier #1 directs the interface controller to do nothing to the data in the associated field, but to transmit it as is.

Field identifier #2 directs the interface controller to encrypt the data in the associated field with the encryption algorithm set to the state recited in the appended 8 octets.

Field identifier #3 directs the interface controller to encrypt the data in the associated field with the encryption algorithm set at whatever state it was in after the last encryption.

Field identifier #4 directs the interface controller to convert the data in the associated field from binary-coded decimal to straight binary.

Field identifier #5 directs the interface controller to convert the data in the associated field from dotted-decimal notation to straight binary.

Field identifier #6 directs the interface controller to overwrite the data in the associated field with the checksum computed on the packet.

Field identifier #7 directs the interface controller to compress the data in the associated field based on a coding table generated from the data within that field and to insert the coding table and the data into the field.

Field identifier #8 directs the interface controller to compress the data in the associated field based on a coding table contained in the adjunct memory.

It will be clear to those skilled in the art how to make and use any set of field identifiers. For example, a field identifier for a preamble, a midamble, or a postamble could instruct the adjunct processor to insert a synchronization sequence of a length specified in the operand at the beginning, middle, or end of a packet, respectively.

In accordance with some alternative embodiments of the present invention, some or all of the operands for a field identifier are not transmitted to the adjunct processor at the time that the field identifiers are transmitted to the adjunct processor, but are transmitted to the adjunct processor within the fields with which they are associated. In other words, the field associated with a field identifier can contain the operand for the field identifier rather than the data to be transmitted to the output device. For example, a field identifier for the insertion of a midamble could insert into the stream of data a synchronization sequence of length specified in the field associated with the field identifier.

In yet some other alternative embodiments of the present invention, some or all of the operands for a field identifier come from a source other than the data source. In any case, it will be clear to those skilled in the art, after reading this specification, how to supply the operands for a field identifier to the adjunct processor.

Referring again to task 402 in FIG. 2, the data source determines which of the available field identifiers should be associated with the fields in the data. Table 4 depicts a mapping of the fields in the augmented payload data with the appropriate field identifiers.

TABLE 4

Mapping of Augmented Payload Fields to Field Identifiers

| Augmented Payload Field | Associated Field Identifier |
| --- | --- |
| 1 | 5 |
| 2 | 4 |
| 3 | 2 |
| 4 | 1 |
| 5 | 3 |
| 6 | 1 |
| 7 | 6 |

For example, the first augmented payload field, the Header Field, is associated with the field identifier #5, which converts the data from dotted-decimal notation to straight binary.

At task 403, the source processor transmits the field identifiers and an indication of an order by which each of the field identifiers is to be uniquely associated with each field in a sequence of fields. This is because, in task 407, the source processor will transmit the augmented payload data, one field after another, to the adjunct processor without any explicit identification of the fields. Therefore, the source processor and the adjunct processor must have some deterministic mechanism for uniquely associating each received field with a field identifier. In other words, at task 407 the source processor will transmit a stream of data that comprises the sequence of fields and an indication of the boundary between successive fields, and the adjunct processor must be capable of properly and deterministically associating each field identifier received in task 404 with each field of data received in task 407. For the purposes of this specification, the term "stream of data" is defined as a temporal succession of one or more information-bearing symbols. A stream of data can be transported over either a serial interface or over a parallel communications path.

In accordance with the illustrative embodiment of the present invention, the source processor transmits with the sequence of field identifiers to the adjunct processor in the order in which they are to be associated with the sequence of fields of data received in task 407. This is depicted in Table 5, which is derived from Table 4.

TABLE 5

Transmission Of Field Identifiers In The Order With Which They Are To Be Associated With The Fields Of Data

| Order Field Identifier Received by Adjunct Processor | Order Field Received by Adjunct Processor | Field Identifier | Interpretation |
| --- | --- | --- | --- |
| 1 | 1 | 5 | the first field received is to be associated with Field Identifier #5 |
| 2 | 2 | 4 | the next field received is to be associated with Field Identifier #4 |
| 3 | 3 | 2 | the next field received is to be associated with Field Identifier #2 |
| 4 | 4 | 1 | the next field received is to be associated with Field Identifier #1 |
| 5 | 5 | 3 | the next field received is to be associated with Field Identifier #3 |
| 6 | 6 | 1 | the next field received is to be associated with Field Identifier #1 |
| 7 | 7 | 6 | the next field received is to be associated with Field Identifier #6 |

In other words, the order of the field identifier in the sequence of field identifiers indicates the order that it is to be associated with its corresponding field in the sequence of fields. Therefore, the order by which each of the field identifiers is to be uniquely associated with each field in the sequence of fields is implicitly indicated by the manner in which the field identifiers is received.

The data in Table 5 is analogous to the message: "Associate field identifier #5 to the first field in the stream of data that you receive, associate field identifier #4 to the first field in the stream of data that you receive, associate field identifier #2 to the first field in the stream of data that you receive, associate field identifier #1 to the first field in the stream of data that you receive, associate field identifier #3 to the first field in the stream of data that you receive, associate field identifier #1 to the first field in the stream of data that you receive, and associate field identifier #6 to the first field in the stream of data that you receive."

In some alternative embodiments of the present invention, the source processor transmits the sequence of field identifiers to the adjunct processor in the reverse order in which they are to be associated with the sequence of fields of data received in task 407. This is depicted in Table 6, which is derived from Table 4.

TABLE 6

Transmission Of Field Identifiers In The Reverse Order With Which They Are To Be Associated With The Fields Of Data

| Order Field Identifier Received by Adjunct Processor | Order Field Received by Adjunct Processor | Field Identifier | Interpretation |
|---|---|---|---|
| 1 | 7 | 6 | the last field received is to be associated with Field Identifier #6 |
| 2 | 6 | 1 | the previous field received is to be associated with Field Identifier #1 |
| 3 | 5 | 3 | the previous field received is to be associated with Field Identifier #3 |
| 4 | 4 | 1 | the previous field received is to be associated with Field Identifier #1 |
| 5 | 3 | 2 | the previous field received is to be associated with Field Identifier #2 |
| 6 | 2 | 4 | the previous field received is to be associated with Field Identifier #4 |
| 7 | 1 | 5 | the previous field received is to be associated with Field Identifier #5 |

Although it might be less readily apparent, here too the mere order by which each of the field identifiers is to be uniquely associated with each field in the sequence of fields is implicitly indicated by the manner in which the field identifiers is received. In other words, the order in which the field identifiers are transmitted and received is not necessarily the same order in which the fields with which they are associated are transmitted and received, but it is deterministically indicative of the order in which the fields with which they are associated are transmitted and received. It will be clear to those skilled in the art how to establish other orders for any number of field identifiers that implicitly and deterministically indicates the order that each is to be associated with each field in the sequence of fields.

The data in Table 6 is analogous to the message: "Associate field identifier #6 to the last field in the stream of data that you receive, associate field identifier #3 to the first before that in the stream of data that you receive, associate field identifier #1 to the first before that in the stream of data that you receive, associate field identifier #1 to the first before that in the stream of data that you receive, associate field identifier #2 to the first before that in the stream of data that you receive, associate field identifier #4 to the first before that in the stream of data that you receive, and associate field identifier #5 to the first before that in the stream of data that you receive."

In some alternative embodiments of the present invention, the source processor transmits the field identifiers to the adjunct processor and an explicit indication of which field identifiers are to be associated with which fields. For example, Table 7 depicts a mapping of the field identifiers to the fields of data with which they are to be associated.

TABLE 7

Explicit Mapping of Field Identifiers to Augmented Payload Fields

| Field Identifier | Association to Augmented Payload Field |
|---|---|
| 1 | Fields 4 & 6 |
| 2 | Field 3 |
| 3 | Field 5 |
| 4 | Field 2 |
| 5 | Field 1 |
| 6 | Field 7 |
| 7 | - none - |
| 8 | - none - |

The data in Table 7 is analogous to the message: "Associate field identifier #1 to the fourth and sixth fields that you receive in the stream of data, associate field identifier #2 to the third field that you receive in the stream of data, associate field identifier #3 to the fifth field that you receive in the stream of data, associate field identifier #4 to the second field that you receive in the stream of data, associate field identifier #5 to the first field that you receive in the stream of data, and associate field identifier #6 to the seventh field that you receive in the stream of data."

It will be clear to those skilled in the art how to generate Table 7 from Table 4. The transmission of Table 7 from the source processor to the adjunct processor is an example of an explicit indication of the order by which each of the plurality of field identifiers is to be uniquely associated with each field in a sequence of fields.

At task 404, the adjunct processor receives the plurality of field identifiers and the indication (either implicit or explicit) of the order by which each of the field identifiers are to be uniquely associated with each field in the sequence of fields to arrive during task 408.

At task 405, the adjunct processor stores in the adjunct memory the field identifiers and the indication (either implicit or explicit) of the order by which each of the field identifiers are to be uniquely associated with each field in the sequence of fields to arrive during task 408.

At task 406, the source processor combines the augmented payload data, which comprises the sequence of fields, and an indication of the boundary between successive fields in the sequence of fields into a first stream of data. In accordance with the illustrative embodiments, the communications path between the source processor and the adjunct processor (including asynchronous buffer 212) is a serial path and every ninth bit is a flag bit that indicates whether the following octet is the beginning of the next field or not. In this way, the sequence of fields is interlaced with the indication of the boundary between successive fields in the sequence of fields.

In some other alternative embodiments of the present invention, the communications path between the source processor and the adjunct processor (including asynchronous buffer 212) is a 9-bit parallel path and one bit in each word is a flag bit that indicates whether the adjacent octet is the beginning of the next field or not.

In any case, it will be clear to those skilled in the art how to combine the augmented payload data and the indication of the boundary between successive fields in the sequence of fields into a first stream of data.

At task 407, the source processor transmits the first stream of data to the adjunct processor. To ensure that the adjunct receiver correctly associates each field in the sequence of fields with the correct field identifier, the source processor transmits the Header Field first, and then the Meeting Size Field, the first Name field, the first Address field, the second Name field, the second Address field, and then the Checksum field. If the source processor were to transmit the fields in any other order after transmitting the sequence of field identifiers to the adjunct processor, the adjunct processor would not be able to correctly associate each field in the sequence of fields with the correct field identifier.

At task 408, the adjunct processor receives the first stream of data from the source processor.

At task 409, the adjunct processor processes each field in the first stream of data in accordance with the field identifier uniquely associated with that field to create a second stream of data. To accomplish this, the adjunct processor uses the indication of the boundary between successive fields (e.g., the flag bits, etc.) to parse the first stream of data into the sequence of fields and then processes the data in each field in accordance with the field identifier uniquely associated with each field. Once again, the adjunct processor uniquely associates each field in the sequence of fields with a field identifier based on the order in which the field appears in the sequence of fields.

At task 410, the adjunct processor transmits the second stream of data to the output device.

In the illustrative embodiments of the present invention, tasks 408, 409, and 410 are performed concurrently. The adjunct processor begins to receive the first stream of data in task 408, operates on it as soon as possible in task 409, and begins to output the second stream of data in task 410 before it has finished receiving the first stream of data. In some alternative embodiments of the present invention, the adjunct processor waits until task 408 is completed before beginning task 409 and waits until task 409 is completed before beginning task 410.

In some embodiments of the present invention, the output of the adjunct processor can be buffered with a variable-depth first-in, first-out queue to ameliorate fluctuations in the rate at which the second stream of data is output to the output device.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   receiving a plurality of operation codes and an indication of an order by which each of said plurality of operation codes is to be uniquely associated with each field in a sequence of fields;
   receiving a stream of data that comprises said sequence of fields and an indication of a boundary between successive fields in said sequence of fields; and
   processing each field in said stream of data in accordance with said operation codes uniquely associated with that field.

2. The method of claim 1 wherein said indication of said order by which each of said plurality of operation codes is to be uniquely associated with each field in said sequence of fields is implicitly indicated by the manner in which said plurality of operation codes is received.

3. The method of claim 1 wherein said indication of said order by which each of said plurality of operation codes is to be uniquely associated with each field in said sequence of fields is explicitly indicated.

4. The method of claim 1 wherein said sequence of fields is interlaced with said indication of the boundary between successive fields in said sequence of fields.

5. The method of claim 1 wherein said reception of said plurality of operation codes occurs before said reception of said stream of data.

6. The method of claim 1 wherein one of said operation codes occurs more than once in said plurality of operation codes.

7. An apparatus comprising:
   a memory for storing a plurality of operation codes and an indication of an order by which each of said plurality of operation codes is to be uniquely associated with each field in a sequence of fields; and
   a processor for receiving a stream of data that comprises said sequence of fields and an indication of a boundary between successive fields in said sequence of fields, and for processing each field in said stream of data in accordance with said operation codes uniquely associated with that field.

8. The apparatus of claim 7 wherein said indication of said order by which each of said plurality of operation codes to be uniquely associated with each field in said sequence of fields is implicitly indicated by the manner in which said plurality of operation codes is stored.

9. The apparatus of claim 7 wherein said indication of said order by which each of said plurality of operation codes is to be uniquely associated with each field in said sequence of fields is explicitly indicated.

10. The apparatus of claim 7 wherein said sequence of fields is interlaced with said indication of the boundary between successive fields in said sequence of fields.

11. The apparatus of claim 7 wherein said reception of said plurality of operation codes occurs before said reception of said stream of data.

12. The apparatus of claim 7 wherein one of said operation codes occurs more than once in said plurality of operation codes.

13. A method comprising:
   receiving at an adjunct processor a sequence of operation codes from a source processor, wherein said sequence of operation codes implicitly indicates an order by which each of said plurality of operation codes to be uniquely associated with each field in a sequence of fields;
   receiving at said adjunct processor a first stream of data from said source processor, wherein said first stream of data comprises said sequence of fields and an indication of a boundary between successive fields in said sequence of fields; and
   processing at said adjunct processor each field in said first stream of data in accordance with said operation codes uniquely associated with that field to create a second stream of data; and
   transmitting said second stream of data to an output device.

14. The method of claim 13 wherein said output device is a network interface.

15. The method of claim 13 wherein at least a portion of said second stream of output data is unmodified by said adjunct processor.

16. The method of claim 13 wherein said sequence of fields is interlaced with said indication of the boundary between successive fields in said sequence of fields.

17. The method of claim 13 wherein said reception of said plurality of operation codes occurs before said reception of said stream of data.

18. The method of claim 13 wherein at least one of said operation codes occurs more than once in said plurality of operation codes.

19. The method of claim 13 wherein said source processor operates in accordance with a first clock, said adjunct processor operates in accordance with a second clock, and said first clock is different than said second clock.

20. The method of claim 13 wherein said adjunct processor and said source processor both operate in accordance with a first clock.

21. An integrated circuit comprising:

a source processor for transmitting a plurality of operation codes and an indication of an order by which each of said plurality of operation codes is to be uniquely associated with each field in a sequence of fields, and for transmitting a first stream of data that comprises said sequence of fields and an indication of a boundary between successive fields in said sequence of fields;

an adjunct memory; and an adjunct processor for receiving said plurality of operation codes and said indication of said order by which each of said plurality of operation codes is to be uniquely associated with each field in said sequence of fields, for storing said plurality of operation codes and said indication of said order by which each of said plurality of operation codes is to be uniquely associated with each field in said sequence of fields into said adjunct memory, for receiving said first stream of data, and for processing each field in said first stream of data in accordance with said operation codes uniquely associated with that field to create a second stream of data.

22. The integrated circuit of claim 21 wherein said output device is a network interface.

23. The integrated circuit of claim 21 wherein at least a portion of said second stream of output data is unmodified by said adjunct processor.

24. The integrated circuit of claim 21 wherein said sequence of fields is interlaced with said indication of the boundary between successive fields in said sequence of fields.

25. The integrated circuit of claim 21 wherein said reception of said plurality of operation codes of occurs before said reception of said stream of data.

26. The integrated circuit of claim 21 wherein at least one of said operation codes occurs more than once in said plurality of field identifiers.

27. The integrated circuit of claim 21 further comprising an asynchronous buffer between said source processor and said second buffer for carrying said first stream of data from said source processor to said adjunct processor.

28. The integrated circuit of claim 21 wherein said source processor operates in accordance with a first clock, said adjunct processor operates in accordance with a second clock, and said first clock is different than said second clock.

29. The integrated circuit of claim 21 wherein said source processor and said adjunct processor both operate in accordance with a first clock.

* * * * *